United States Patent
Weick et al.

(10) Patent No.: US 8,258,430 B2
(45) Date of Patent: Sep. 4, 2012

(54) ASCERTAINING A LASER BEAM CONTACT POINT

(75) Inventors: Juergen-Michael Weick, Asperg (DE); Andreas Milich, Hemmingen (DE); Ulrich Ritter, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 303 days.

(21) Appl. No.: 12/640,127

(22) Filed: Dec. 17, 2009

(65) Prior Publication Data

US 2010/0116797 A1    May 13, 2010

Related U.S. Application Data

(63) Continuation of application No. PCT/EP2008/003297, filed on Apr. 24, 2008.

(30) Foreign Application Priority Data

Jun. 27, 2007    (DE) .......................... 10 2007 029 787

(51) Int. Cl.
*B23K 26/04*    (2006.01)
(52) U.S. Cl. .............................. 219/121.83; 219/121.67
(58) Field of Classification Search ............. 219/121.67, 219/121.83, 121.62, 121.6, 121.84; 73/655
See application file for complete search history.

(56) References Cited

U.S. PATENT DOCUMENTS

| | | | |
|---|---|---|---|
| 5,574,225 A | 11/1996 | Modern et al. | |
| 5,670,773 A | 9/1997 | Planeix | |
| 2003/0149426 A1* | 8/2003 | Yee et al. | 606/5 |
| 2005/0263509 A1* | 12/2005 | Yamazaki et al. | 219/121.84 |

FOREIGN PATENT DOCUMENTS

| | | | |
|---|---|---|---|
| EP | 1600248 | | 11/2005 |
| EP | 1592532 | | 6/2006 |
| JP | 63108985 | | 5/1988 |
| JP | 04295711 | | 10/1992 |
| JP | 7-60468 A | * | 3/1995 |
| JP | 07144289 | | 6/1995 |
| JP | 8-118047 A | * | 5/1996 |
| JP | 08118047 | | 5/1996 |

OTHER PUBLICATIONS

International Search Report from corresponding PCT Application No. PCT/EP2008/003297, received Sep. 1, 2008, 12 pages.
Notification of Transmittal of Translation of the International Preliminary Report on Patentability from corresponding PCT Application No. PCT/EP2008/003297, mailed Feb. 11, 2010, 8 pages.
Office Action from corresponding German Application No. 10 2007 029 787.6-64, mailed Jan. 22, 2008, 5 pages.

* cited by examiner

*Primary Examiner* — Geoffrey S Evans
(74) *Attorney, Agent, or Firm* — Fish & Richardson P.C.

(57) ABSTRACT

A method of determining a contact point of a laser beam on an edge of a body and a system for performing the same, in which the method includes a) moving the laser beam relative to the edge in a spatial direction until the laser beam touches the edge, in which the spatial direction is at a right angle relative to an axis of the laser beam and in which the edge is formed at an opening, b) measuring acoustic oscillations produced photoacoustically during the movement of the laser beam, and c) determining the laser beam point of contact with the edge based on the measured acoustic oscillations.

22 Claims, 3 Drawing Sheets

ASCERTAINING A LASER BEAM CONTACT POINT

CROSS REFERENCE OF RELATED APPLICATIONS

This application is a continuation of and claims priority under 35 U.S.C. §120 to PCT/EP2008/003297, filed on Apr. 24, 2008, and designating the U.S., which claims priority under 35 U.S.C. §119 to German Patent Application No. 10 2007 029 787.6-34, filed on Jun. 27, 2007. The contents of both the prior applications are hereby incorporated by reference in their entirety.

TECHNICAL FIELD

The present disclosure relates to a method for determining a contact point of a focused pulsed laser beam on an edge of a body, in which the edge is preferably formed on an opening of the body, and a laser processing machine for performing the same.

BACKGROUND

In laser processing machines, it is preferable to know an actual position (X-Y position) of the laser beam within the laser processing nozzle and a focus position (Z position) of the laser beam relative to a workpiece surface as accurately as possible or to orientate the laser beam, that is to say, to position the laser beam at a desired position relative to the nozzle opening and/or relative to the workpiece surface. To that end, a contact point of the laser beam on an edge of the nozzle opening or the edge of another, suitably positioned body can be established.

The desired position of the laser beam relative to the laser processing nozzle is generally at the center of the nozzle opening. The orientation is normally carried out manually in the prior art. To that end, an adhesive strip is adhesively bonded over the nozzle opening and a small hole is burnt into the adhesive strip at low laser power. The deviation of the beam position from the nozzle center is determined with the naked eye and a magnifying glass. Corresponding positioning units are used to correct the beam position and have adjustment screws extending at right-angles relative to the nozzle axis, by means of which the position of the laser beam can be changed in an X direction and Y direction in an X-Y plane of the nozzle opening. That operation is imprecise, time-intensive and unsuitable for automated process operations owing to the manual actions which are necessary.

U.S. Pat. No. 5,574,225 and JP-04295711A disclose a device and a method for establishing the position of a pulsed laser beam by means of two or more acoustic sensors which have an exact position relative to a plate-like optical element that is arranged in the beam path. The pulsed laser beam triggers an acoustic wave in the optical element owing to the photoacoustic effect, in which the acoustic wave is detected by the acoustic sensors. The phase difference of the acoustic wave signal, which is introduced into the acoustic sensors in a time-staggered manner, is used as a measure for the displacement of the laser beam relative to the optical axis which extends through the center of the optical element. The devices described in U.S. Pat. No. 5,574,225 and JP-04295711A require very precise positioning of the acoustic sensors for accurate orientation of the beam.

Various methods are known for establishing the focus position of the laser beam, that is to say, the position of the beam focus relative to the workpiece surface. JP-63108985A discloses a method using the photoacoustic effect. The beam diameter on a workpiece varies during the movement of the laser processing head of the laser processing machine in the propagation direction of the beam. In principle, a small beam diameter on the workpiece results in great intensity of the acoustic signal produced, and vice versa. If the focal point is in the plane of the workpiece, the diameter of the laser spot on the material surface is at a minimum and the intensity of the photoacoustic signal is at a maximum. If maximum intensity is detected when the acoustic signal is evaluated, the focal point is in the plane of the workpiece and the focus position is established as a result.

SUMMARY

In one aspect, the disclosure features a method of orienting a laser beam in a simple and automatable manner by determining a contact point of the laser beam on an edge formed at an opening of a laser processing nozzle or a workpiece and a laser processing machine for performing the same.

A method of orienting the laser beam includes: a) moving the laser beam relative to an edge in at least one spatial direction, preferably at right-angles relative to the laser beam axis, until the laser beam touches the edge; b) measuring acoustic oscillations produced photoacoustically by the laser beam during the movement of the laser beam; and c) determining the contact point of the laser beam on the edge by evaluating the acoustic oscillations measured. The position coordinates of the contact point can subsequently be stored in a storage device which is formed, for example, in a control unit.

The photoacoustic effect is used to determine the contact point of the laser beam. A pulsed laser beam travels through a nozzle opening in a propagation direction (Z direction), which substantially corresponds to the direction of the nozzle axis. The beam is displaced in a plane (X-Y plane), which is at right-angles relative to the propagation direction, inside the opening in the nozzle body or against an edge or inside an opening of a workpiece until it strikes the generally metal nozzle body or the workpiece and, at that location, produces an acoustic wave which can be received by an acoustic sensor such as, for example, a microphone. Accordingly, only a single sensor, for which knowledge of an exact position is not necessary, is capable of determining the contact point of the laser beam. If the position coordinates of the start point are known before the movement of the laser beam, the travel path of the laser beam as far as contact with the edge and therefore also the dimension of the beam in the X-Y plane are further determined.

If the method of orienting the laser beam is carried out again after adjustment of the focus position of the laser beam in the direction of the laser beam axis (Z direction), it is possible to determine, by multiple repetitions, the shape of the laser beam in the Z direction (beam caustic) in relation to the edge and the position of the smallest beam diameter. In that manner, the focus position of the laser beam is determined relative to the opening of the laser processing nozzle or the workpiece.

In order to determine the contact point on an edge of the nozzle or workpiece, the oscillation power, which increases at the periphery of the edge, is measured, in some embodiments, in accordance with the location of the beam. For example, the contact point can be associated with a predetermined fraction, such as 50% of a maximum oscillation power. Preferably, the microphone does not receive any signal as long as the laser beam travels without any contact through the opening or past the edge. In contrast, when the laser beam begins to graze the periphery of the opening, and therefore the edge, an increase in the signal intensity can be observed as contact with the edge increases. The increase in signal intensity can be detected as a transition in a characteristic line which corresponds to a plot of acoustic power versus beam position.

The laser beam is preferably moved in such a manner that it completely touches the opening in a first spatial direction, for example, the X direction. That is to say that the beam strikes the nozzle body or the workpiece at two opposite contact points, which can be determined by an increase in the acoustic signal (signal edge). The laser beam is preferably moved in this instance along a line in the first spatial direction. Alternatively, it is also possible to move the laser beam along a circular path or another curve relative to the opening until it strikes the nozzle body or the workpiece at two opposite points. In that instance, the first spatial direction in which the actual or desired position is determined is fixed as the line which joins the two contact points together.

As set out above, the two contact points in the first spatial direction can be determined by means of the acoustic signal measured. From the knowledge of the contact points and the movement path during the movement of the laser beam relative to the opening, it is possible to determine an actual position of the laser beam relative to the opening. Alternatively or in addition, it is also possible to establish, when the contact points are known, a desired position of the laser beam. Generally, the desired position is at the center between the two contact points because normally a central orientation of the laser beam in the opening is desirable. It will be understood that, in the manner described above, the actual and/or desired position can be established not only in the X direction but also in the Y direction. If the desired position is known in two directions, the laser beam can be orientated at the center of the opening, preferably therefore at the center of the nozzle.

In some implementations, the laser beam is moved towards the desired position after the desired position, which is preferably at the center between the two contact points, has been established. When the desired position is established in two directions, the laser beam can thereby be positioned at the center of the nozzle. Before moving to the nozzle center, the desired position can first be established in the two spatial directions of the X-Y plane in accordance with the above-described method. However, the desired position in the X direction is first preferably established and the laser beam is subsequently centered in the opening in the X direction. Centering of the laser beam in the Y direction can be carried out after centering in the X direction. It is thereby ensured that the whole diameter of the opening in the Y direction, in the case of an opening which is, for example, circular, is available to establish the desired value, whereby the accuracy can be increased for establishing the contact points and, therefore, for establishing the desired value in the Y direction.

In particular, when the laser beam was positioned near the periphery of the opening before the desired position in the X direction was established so that two contact points were established which have a small spacing relative to each other in the X direction, it is possible to repeat the establishing of the desired position in the X direction after the laser beam has been moved into the desired position in the Y direction in order to increase accuracy. When the desired position in the X direction is established again, there is a greater spacing between the two contact points, for example, in the case of circular openings, which can increase the accuracy when the desired position is established. It will be understood that the second direction does not necessarily have to extend at right-angles relative to the first direction. Instead, both directions can also have, for example, an angle of 120° or 60° relative to each other and do not have to correspond to the axes of movement (X or Y) of the laser processing machine.

By knowing the two contact points, it is possible to determine either the diameter of the opening, preferably the nozzle opening, or, in the case of a known opening diameter, the diameter of the laser beam in the first spatial direction, from the respective movement path of the laser beam from a start point of the movement to the opposite contact points.

In some embodiments, a cross-section dimension of the opening is determined from the spacing between the two contact points in the first spatial direction and the spacing between two additional contact points in a second spatial direction. In particular, in the case of circular nozzle openings, it is thereby possible to determine the opening diameter. The method therefore acts as a validation control after changing nozzles, with calibration measurements being used in order to correlate the values measured with the real diameter.

In some embodiments, the laser beam is moved relative to the edge, in which the edge is stationary. This includes automatically moving the laser processing head or, preferably, automatically pivoting an optical focusing unit arranged in the beam path, and/or automatically displacing the focusing unit transversely relative to the laser beam. Alternatively, or in addition, at least one redirecting mirror arranged in the beam path upstream of the nozzle body can be pivoted, for example, in an automatic manner, or changed in terms of its radius of curvature. In the case of displacement transversely relative to the laser beam, the optical focusing unit is moved in a plane perpendicular relative to the optical axis thereof. Alternatively or in addition, the movement of the laser beam can be carried out by means of pivoting, for example, of the last or penultimate redirecting mirror upstream of the optical focusing unit, or it is possible to displace the nozzle body with the laser beam being fixed in position. In order to move the laser beam focus along the laser beam axis (in the Z direction), the radius of curvature of a redirecting mirror which is arranged upstream of the optical focusing unit is preferably changed.

In some embodiments, the oscillations are measured by means of at least one acoustic sensor, preferably a microphone. The microphone is orientated in such a manner that it receives only acoustic signals which are generated photoacoustically, if possible. The microphone receives either the structure-borne noise from the nozzle body or the workpiece itself or the acoustic signal from the air. A measurement device converts the voltage signal output by the microphone into a digital signal. The frequency spectrum is calculated from the digital signal (Fourier analysis) and is set out as a frequency-related power (FFT power). One or more additional acoustic sensors can be provided for control measurements or for improving a precision of the beam position.

In some embodiments, the properties of the oscillations are compared with characteristic values of the pulsed laser beam when the measured oscillations are evaluated. The properties of the measured oscillations, in particular frequency and phase, are compared in this case with the pulse duration, pulse frequency and phase of the pulsed laser beam in order to prevent measurement errors (for example, disruptive noises from drives).

In some embodiments, the movement and measurement are carried out under protective gas. In order to protect the optical focusing unit and the nozzle body, it is possible in this instance to produce a stream of protective gas, with, for example, nitrogen being used as the protective gas. The protective gas allows the measurement to be carried out even at high laser powers, in particular operating power levels, so that the effects of thermal variations of optical elements in the beam path upstream of the nozzle can also be detected and particularly deviations of the beam position from the optical axis can be detected.

In some embodiments, the oscillations measured are produced by a preferably plate-like body (workpiece) which is arranged in the beam path downstream of a nozzle body. If the laser beam is displaced in the X-Y plane of the nozzle opening and strikes the periphery of the nozzle opening, a lower level of laser power is present on the plate-like body. This results in a reduction in intensity of the acoustic signal produced in the body. It will be understood that, in this case, the photoacoustic signal generated in the nozzle body must be screened in order to be able to measure only the signal resulting from the plate-like body with the acoustic sensor.

In some embodiments, the spacing between the focal point of the laser beam and the plate-like body is varied in the propagation direction of the laser beam, in order to determine a focus position of the laser beam, that is to say, the spacing between the focal point and the workpiece plane. When the body is moved in the propagation direction, the focal diameter on the plate-like body varies. In principle, a small focal diameter on the body results in a large intensity of the acoustic signal produced, and vice versa. If the focal point is in the plane of the body, the diameter of the laser spot on the material surface is at a minimum and the intensity of the photoacoustic signal is at a maximum. If a maximum intensity is detected when the acoustic signal is evaluated, the focal point is in the plane of the plate-like body and the focus position is therefore determined. The focus position determined in this manner can be compared with a predetermined desired focus position which is generally selected in such a manner that the focal point is in the operating plane or workpiece plane. If the predetermined desired focus position and the focus position determined on the basis of the measurement differ from each other, the focus position can be corrected by means of the measurement results.

In order to vary the focus position and thereby the focal diameter on the body, there are the following possibilities: an optical focusing unit for the laser beam and/or the plate-like body can be moved in the propagation direction of the laser beam. Alternatively or in addition, the whole laser processing head is moved in the Z direction, while the plate-like body remains stationary. However, it is preferable for an adaptive redirecting mirror to be displaced in the beam path upstream of the nozzle body. Such an adaptive redirecting mirror is flushed with water, for example, at the rear of the mirror. The degree of curvature of the mirror and therefore the focus are changed by the different water pressure.

In some embodiments, the material of the plate-like body is selected in such a manner that it absorbs more laser power than the material of the nozzle body does. If a material, for example, a ceramic material, that absorbs more energy than the generally metal material of the nozzle body does is used for the plate-like body, the acoustic signal is amplified and the measurement can be carried out with relatively low laser power levels so that the nozzle body is struck with a lower level of power and is thereby protected.

Therefore, both centering of the laser beam in a laser processing nozzle and determining and adjustment of the focus position of the laser beam in relation to the laser processing nozzle or a (test) workpiece can be achieved. Both centering and adjustment of the focus position can be carried out by the laser processing nozzle acting as a measurement object when the acoustic signal is produced directly at the periphery of the nozzle opening. Therefore, a separate object does not have to be introduced into the beam path for the measurement.

The foregoing embodiments also can be implemented in a laser processing machine having a laser processing nozzle on a laser processing head. A pulsed, focused laser beam passes through the opening of the nozzle, with the laser beam and the opening being movable relative to each other in at least a first spatial direction that is at right-angles relative to the laser beam axis until the laser beam touches an edge of a body. The edge is preferably formed at an opening of the body. The laser processing machine further includes at least one acoustic sensor, preferably a microphone, for measuring acoustic oscillations which are produced photoacoustically during the movement of the laser beam, and includes an evaluation device, which is configured so as to determine a contact point of the laser beam on the edge by evaluating the oscillations measured.

In some embodiments, the laser processing machine further includes a preferably automatic movement device for pivoting and/or displacing an optical focusing unit, which is arranged in the beam path upstream of the nozzle body, transversely relative to the laser beam. The displacement can be carried out, for example, using step motors, whereby information concerning the movement path is provided at the same time.

In some embodiments, the movement device is fitted in a laser processing head or to an adjustment station of the laser processing machine, into which the laser processing head can be moved in order to determine an actual or desired position of the laser beam in the opening and/or a focus position and in order to move the laser beam to the desired position and/or to adjust the focus position. The step motors which act as the movement device are, in the former case, mounted directly on the laser processing head in place of the conventional adjustment screws so that automated orientation of the laser beam can be achieved relative to the nozzle edge. In the latter case, the step motors are in the adjustment station at an adjustment position, into which the laser processing head can be moved in order to adjust the beam position, so as to be coupled to adjustment spindles.

In some embodiments, the laser processing machine further has a preferably plate-like body, which is arranged in the beam path downstream of the nozzle body and which preferably has an edge which is formed particularly on an opening of the plate-like body. As described above, the material of the body can be selected in such a manner that it absorbs more laser radiation than the material of the nozzle body does so that the measurement can be carried out at lower beam power levels, whereby the nozzle body is protected. The body can further have an opening or edge so that the focus position of the laser beam can be adjusted in relation to that opening or edge.

In some embodiments, the laser processing machine further has a beam trap for protecting the acoustic sensor from scattered light. The beam trap is arranged at a suitable distance from the periphery of the opening below the nozzle body in the beam path and absorbs the laser beam, whereby the acoustic sensor is protected from destruction by the laser radiation.

In some embodiments, the acoustic sensor is positioned outside the beam path so as to be displaced in a spatial direction relative to the laser beam axis and is orientated at an angle relative to the laser beam axis or the plate-like body. Accordingly, the contribution of interference noises, which are not caused by the photoacoustic effect, can be reduced. However, the positioning of the acoustic sensor serves not only to screen out interference noises by selective orientation relative to the nozzle or the plate-like body, but instead also has an influence on the intensity measured. At specific positions/angles of the optical sensor, significantly greater maximum values are measured with constant laser power than at other positions/angles. More intensive maximum values in the characteristic line allow a higher level of precision for determining the contact points because, in that case, the transitions of the characteristic line are steeper. In the case of a circular opening, the angle and the spatial direction, in which the acoustic sensor is displaced relative to the nozzle axis, also have an influence on the intensity maximum values because structural elements which are not arranged in a rotationally symmetrical manner relative to the opening in the laser processing machine can influence the measurement.

Additional advantages will be appreciated from the description and the drawings. The features set out above and those set out below can also be used individually or together in any combination. The embodiments illustrated and described are not intended to be understood to be a conclusive listing, but instead are of exemplary character for describing the invention.

The details of one or more embodiments are set forth in the accompanying drawings and the description below. Other features and advantages will be apparent from the description, drawings and from the claims. Standard F&R paragraph before brief description

DETAILED DESCRIPTION

Figure 1:
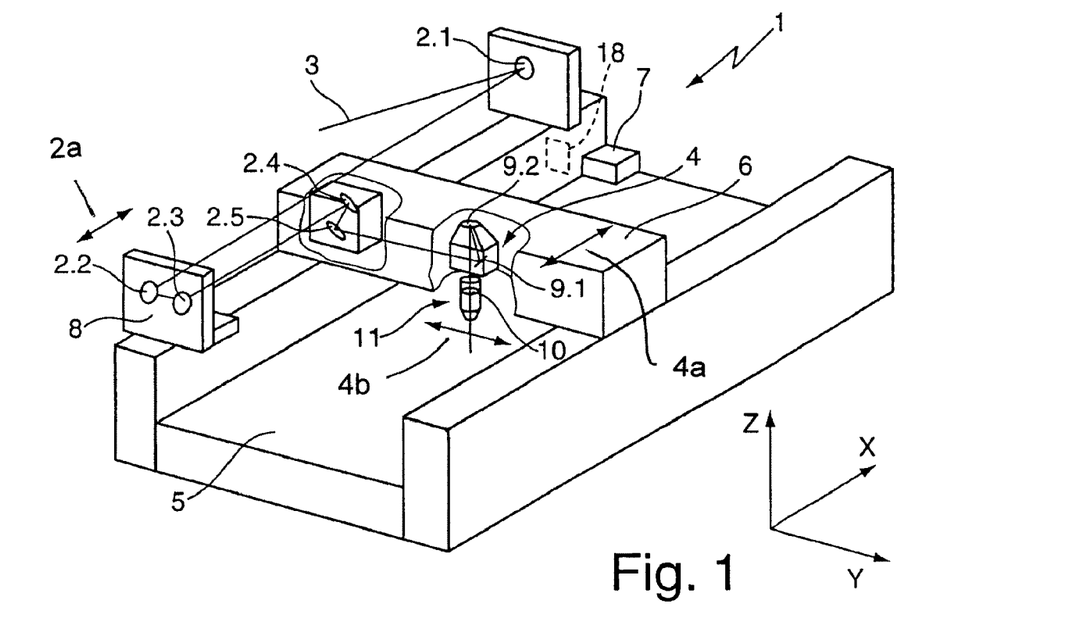
FIG. 1 is a schematic illustration of a laser processing machine.

FIG. 1 shows a laser processing machine 1 having an optical unit, which has a plurality of optical elements 2.1 to 2.5, for guiding a laser beam 3 to a laser processing head 4 for processing a workpiece (not shown). In order to move the laser processing head 4 along a processing table which defines a work plane 5 in a first spatial direction X of an XYZ coordinate system, the laser processing head 4 is secured to a carriage 6 which can be moved in the first spatial direction X, as indicated by a double-headed arrow 4a. The laser processing head 4 can further be moved in a second spatial direction Y in the work plane 5 by being displaced along the carriage 6, as also indicated by a double-headed arrow 4b. Accordingly, the laser processing head 4 can be displaced in both spatial directions X, Y over the entire work plane 5 of the processing table and a workpiece positioned thereon can be processed. The laser processing head 4 can further be moved into an adjustment position at the edge of the processing table 5, where there is provided an adjustment station 7, at which the laser processing head 4 can be adjusted, as described in greater detail below.

The pulsed laser beam 3 is guided from a laser source (not illustrated), via a first mirror 2.1 to a compensation element 8 which has two additional mirrors 2.2 and 2.3 and which can be displaced in the first spatial direction X, as indicated by another double-headed arrow 2a. By displacing the compensation element 8, the beam path of the laser beam 3 in the laser processing machine 1 can be kept constant. After the laser beam 3 has been redirected out of the first spatial direction X and into the second spatial direction Y by means of two additional mirrors 2.4 and 2.5, which are arranged in the carriage 6, the laser beam 3 is introduced into the laser processing head 4, where it is redirected out of the second spatial direction Y and into a third spatial direction Z by means of a first and a second redirecting mirror 9.1, 9.2. In this instance, the second redirecting mirror 9.2 is constructed as an adaptive mirror, i.e., it can change its shape in order to ultimately shape the laser beam 3. Downstream of the second redirecting mirror 9.2, the laser beam 3 passes through an optical focusing unit 10 for focusing the laser beam 3 onto a focal point F in the work plane 5 of a laser processing nozzle 11, as shown in detail in FIGS. 2a and 2b as a cross-section of the laser processing head 4. The laser processing nozzle 11 has a metal nozzle body 12, in which there is provided a nozzle opening 13 having a circular opening 14, through the center of which the laser beam axis 15 extends in FIGS. 2a and 2b.

Figure 3A:
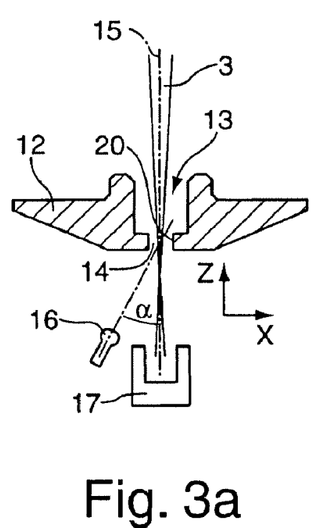
FIGS. 3a, 3b and 3c are schematic illustrations of the movement of a laser beam from an initial position to a first side of a periphery of an opening.

In order to determine the position of the laser beam 3 relative to the opening 14, the laser processing head 4 is moved to the adjustment station 7. As shown in FIG. 3a, a microphone 16 acting as an acoustic sensor is arranged downstream of the nozzle body 12 and at an angle α of about 30° relative to the laser beam axis 15, after the laser processing head 4 has been moved into the adjustment position so as to be displaced in the first spatial direction X relative to the laser beam axis 15 outside the beam path. In order to protect the microphone 16 from scattered light which is caused by the laser beam 3, the laser beam 3 is absorbed by a beam trap 17. In order further to protect the nozzle body 12 from damage, it is protected by a protective gas stream (not illustrated) of nitrogen.

Figure 3B:
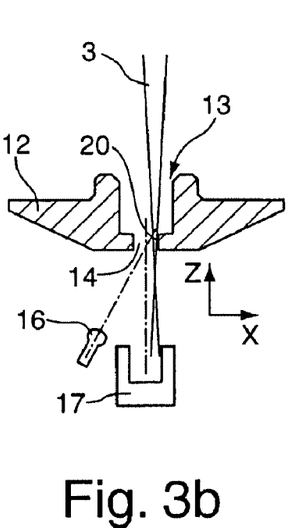
Figure 3C:
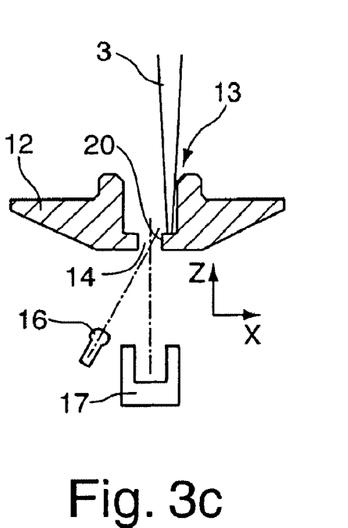
Figure 4A:
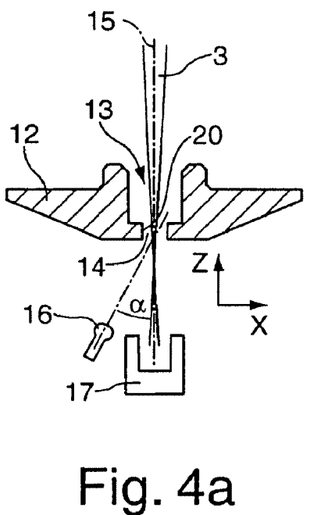
FIGS. 4a, 4b and 4c are schematic illustrations of the movement of the laser beam of FIGS. 3a, 3b and 3c to an opposite side of the periphery of the opening.
Figure 4B:
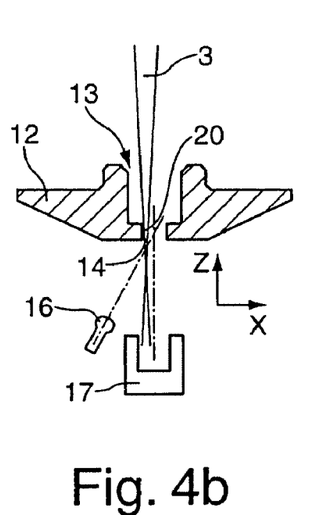
Figure 4C:
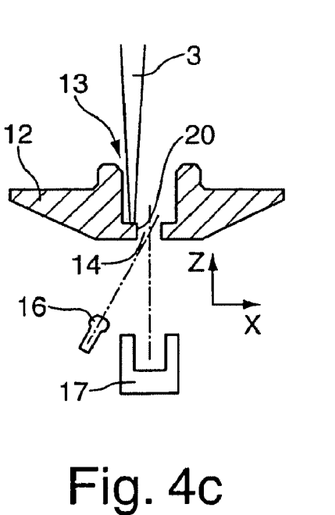

In order to position the laser beam 3 at the center of the nozzle at a desired position which coincides with the position of the laser beam axis 15 at the nozzle center in the case of the circular opening 14, a desired position in the first spatial direction X ("X direction") should first be established. For that purpose, the laser beam 3 is moved out of the initial position shown in FIG. 3a in the positive X direction by displacing the optical focusing unit 10 shown in FIG. 2 in the X direction. During the movement, the laser beam 3 first touches the periphery of the opening 14, cf. FIG. 3b, and is subsequently further displaced in the X direction until it completely strikes the nozzle body 12, cf. FIG. 3c. The laser beam 3 then is moved back in the negative X direction into the initial position which is shown in FIG. 4a to touch the periphery of the nozzle opening 14 (FIG. 4b) before the laser beam 3 completely strikes the nozzle body 12 (FIG. 4c). During the movement of the laser beam 3 shown in FIGS. 3a-c and FIGS. 4a-c, the beam 3 consequently travels over the nozzle opening 12 completely in the X direction and strikes an edge 20 of the opening 14 at two opposite sides.

During the above-described movement, as soon as the pulsed laser beam 3 strikes the metal nozzle body 12 (cf. FIGS. 3b,c and FIGS. 4b,c), it triggers a photoacoustic wave at that location. Consequently, the pulsed laser beam 3 triggers an acoustic signal at a frequency which corresponds to the pulse frequency of the beam 3. At an appropriately selected pulse frequency, the acoustic signal is in the audible range and can be detected by the microphone 16, with an increase in the laser frequency owing to the moment of inertia resulting in a reduction of the signal intensity as expected.

Although the gas pressure of the air is also directly changed by the heating as a result of the laser radiation, those pressure fluctuations are generally too weak or the ambient noise is too loud to be measured with conventional microphones.

In order to determine the contact points of the opening 14, between which a desired position can be established, from the movement of the laser beam in the X direction shown in FIGS. 3a-c and FIGS. 4a-c, the acoustic oscillations (which are measured during the movement of the laser beam with the microphone 16 and which are converted into an analogue voltage signal) are converted into a digital signal in an evaluation unit 18 of the laser processing machine 1 (cf. FIG. 1). The frequency spectrum is calculated from the digital signal (Fourier analysis) and is set out as a frequency-related power (Fast Fourier transformation, FFT power). The frequency and phase of the digital signal are compared in this instance with the pulse frequency and the phase of the laser pulses of the laser beam 3 in order to prevent measurement errors (due to, for example, interference noises from drivers or other devices in the processing environment).

Figure 5:
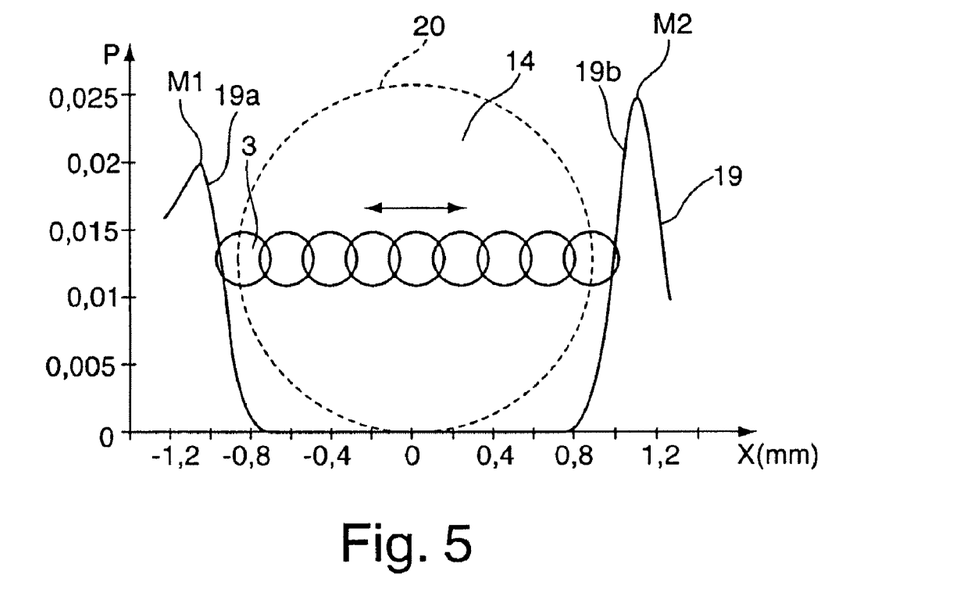
FIG. 5 shows a plot of frequency-related power versus position in the X direction.

FIG. 5 shows a plot of frequency-related power, i.e., the power measured at the beam pulse frequency, versus position in the X direction. FIG. 5 includes measurement line 19 which is produced during an evaluation of the laser beam 3. During the evaluation, the maximum sound intensity of the acoustic signal is measured at a number of measurement points and is set out as a frequency-related power. As is visible in FIG. 5, the microphone 16 does not receive any signal as long as the laser beam 3 passes without contact through the opening 12. Only when the laser beam 3 begins to touch the edge 20 of the opening 14 is an increase in the signal intensity observed with an increasing contact portion and can be seen as transitions 19a, 19b in the measurement line 19. The gradient of the transitions 19a, 19b is dependent, among other things, on the position (angle, distance) of the microphone 16 in relation to the opening 14. If the complete beam diameter strikes the nozzle body 12, the signal intensity of the measurement line 19 is reduced in the case of further redirection. A defined maximum M1, M2 is thereby formed at each transition 19a, 19b.

In the example shown, the optical focusing unit 10 was displaced in the X direction over the entire possible displacement range of ±2 mm, whereby the laser beam 3 was moved in that direction, as is illustrated in FIG. 5 by overlapping beam cross-sections. In the measurement line 19 shown in FIG. 5, the laser power was 1.5 kW and the pulse frequency of the laser beam 3 was 500 Hz. Measurements of the acoustic signal were carried out at a distance of 90 µm. The progression of the measurement line 19 shows an increase, which is also illustrated in FIG. 5, as soon as the laser beam 3 touches the edge 20 of the opening 14.

Figures 6A, 6B:
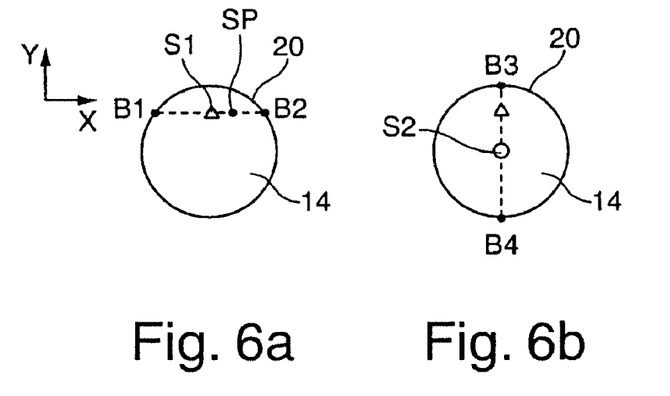
FIGS. 6a, 6b and 6c are a schematic top view of an opening of a laser processing nozzle.

In order to determine the contact points, the locations at which the measured intensity is about 50% with respect to maximum intensities M1, M2, respectively, are identified at the two measurement transitions 19a, 19b. The locations determined in this manner are identified with a first and a second contact point B1, B2 of the opening 14 which are opposite each other in the X direction, cf. FIG. 6a. A desired position S1 for centering the laser beam 3 at the center of the nozzle is established as the center point of those contact points B1, B2 in the X direction. Alternatively or additionally, the actual position of the laser beam 3 relative to the opening 14 can also be determined if the contact points B1, B2 and the movement path of the laser beam 3 are known.

Figure 6C:
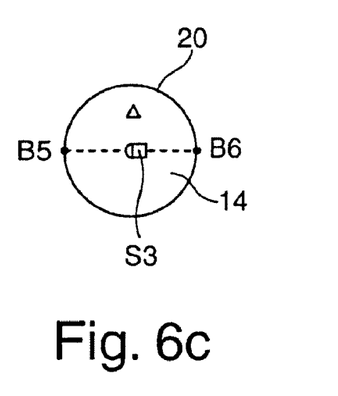

After the desired position S1 has been established, the laser beam 3 is moved towards that position and the measurement process set out above is repeated in the second spatial direction Y ("Y direction"). In this instance, a third and a fourth contact point B3, B4 of the opening 14 are determined and a second desired position S2 at the center point between the third and fourth contact points B3, B4 is established, cf. FIG. 6b. After the laser beam 3 has been moved to the second desired position S2, it is preferably positioned at the center of the opening 14. In the present case, however, the spacing provided for establishing the first desired value S1 between the first and second contact points B1, B2 is extremely small so that the establishment of the first desired value may not have been carried out with sufficient precision. Therefore, it is possible to carry out, as illustrated in FIG. 6c, the above-described measurement again in the X direction, with a fifth and sixth contact point B5, B6 being determined. Owing to the greater spacing between the fifth and sixth contact points B5, B6, it is possible to establish a third desired position S3 which is more precise than the first desired position S1 in the X direction.

After the laser beam 3 has been moved to the third desired position S3, it is definitively centered at the center of the opening 12. In addition, it is also possible to determine the diameter of the circular opening 12 from the determined contact points B1 to B6. This may require a calibration operation, during which a percentage of the maximum frequency-related power, at which the diameter can be determined most precisely, is identified. Such establishment of the nozzle diameter can serve as a validation control when the laser processing nozzle 11 is changed.

Following the centering of the laser beam 3 at the center of the laser processing nozzle 11, the position of the laser beam focal point relative to the laser processing nozzle is determined and adjusted. To that end, a contact point (B1 to B6) of the laser beam 3 at the nozzle opening is determined, as described above, from a start point SP in the X-Y plane, in which the coordinates of point SP are stored in the control unit. As shown in FIG. 3a, the laser beam 3 is moved from the start point SP in the positive X or Y direction by displacing the optical focusing unit 10 shown in FIGS. 2a,b in the X or Y direction. During the movement, the laser beam 3 first touches the edge 20 of the opening 14, cf. FIG. 3b, and then is further displaced in the X direction until it completely strikes the nozzle body 12, cf. FIG. 3c. The coordinates of the contact point determined are also stored in the control unit. It is possible to determine, from the stored coordinates, the path distance from the start point SP to the location at which the laser beam strikes the nozzle opening and, from that, the position of the laser beam in the X-Y plane. If the measurement from the start point is repeated in the negative X or Y direction, the diameter of the laser beam is determined for a known diameter of the nozzle opening. Subsequently, the focal point of the laser beam is displaced in the Z direction by changing the radius of curvature of the adaptive redirecting mirror 9.2 and the measurement is carried out again. If this is repeated several times, it is possible to determine the shape of the laser beam, i.e., the beam caustic, in relation to the nozzle opening. The Z adjustment, in which the smallest propagation or the smallest diameter of the beam is measured, indicates that the focal point of the laser beam is precisely in the X-Y plane of the nozzle opening. Subsequently, the focal point is displaced in a defined manner into a plane below the nozzle opening, usually precisely into the work plane 5. The determination of the focus position does not have to be carried out by the nozzle body, but instead can be carried out on a (test) workpiece, which is in the work plane 5 and which has a defined edge or a square or circular opening which is scanned by the laser beam. However, the use of the laser processing nozzle as a measurement object has the advantage that no additional workpiece has to be introduced into the beam path.

In order to move the laser beam 3 in the X-Y plane, the optical focusing unit 10 shown in FIG. 2 is displaced in the X and Y direction. That movement is carried out using step motors (which are not shown but whose paths are indicated by a double-headed arrow B), where information concerning the movement path of the step motors is provided by one or more step motor controllers (not shown) at the same time. The step motors are coupled to movement spindles in the adjustment station 7 of FIG. 1, to which the laser processing head 4 has to travel in order to adjust the beam position. Alternatively or additionally, the redirection of the laser beam can be carried out by pivoting the last or penultimate redirecting mirror 9.1, 9.2 upstream of the optical focusing unit 10.

As an alternative to the arrangement of an acoustic sensor in the beam path downstream of the nozzle body 12, it can also be fitted directly to the nozzle body 12 in order to receive structure-borne noise from the body 12. In this case, it is advantageous to fit the step motors directly to the laser processing head 4, i.e., in place of the conventional adjustment screws. In this instance, it is possible to dispense with the provision of an adjustment station, i.e., the adjustment can be carried out in principle at any location in the work plane 5 because all the structural elements necessary for this purpose are fitted in the laser processing head 4 except for the evaluation device 18.

Figure 2A:
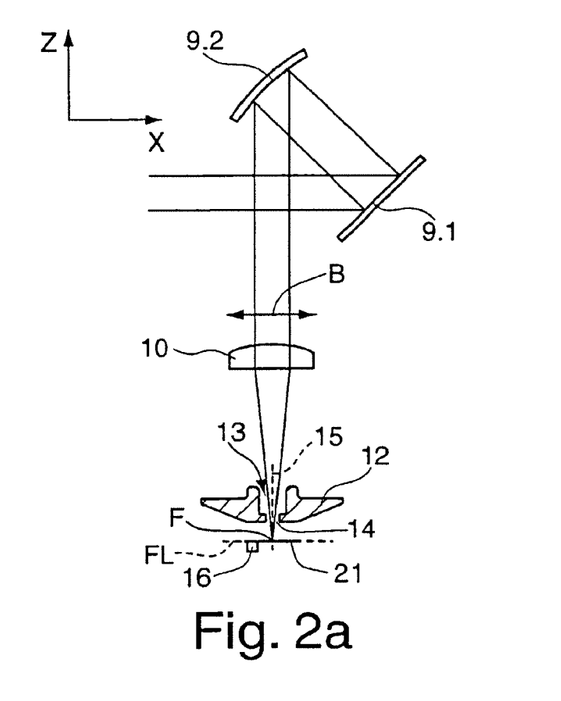
FIGS. 2a and 2b are schematic cross-sections through a laser processing head of the laser processing machine of FIG. 1.

As an alternative to the operation described above, it is further possible to carry out measurements using the acoustic oscillations emitted by a plate-like body 21, which is shown in FIG. 2a and which the laser beam 3 strikes below the nozzle body 12. The oscillations emitted by body 21 are measured in place of the acoustic oscillations produced by the nozzle body 12. In this case, there is a piezoelectric sensor 16' arranged at the side of the body 21 facing away from the nozzle body 12 so that the body 21 screens the acoustic oscillations which are emitted by the nozzle body 12.

When the laser beam 3 is moved in the X-Y plane of the nozzle opening 14, less laser power is present at the plate-like body 21 as soon as the laser strikes the edge 20 of the opening 14, which can result in a reduction in intensity of the acoustic signal produced by the laser beam 3 in the plate-like body 21. In order to determine the center of the nozzle, the laser beam 3 is displaced outwardly until it is screened, for example, by half using the nozzle body 12. Consequently, the intensity of the signal being emitted by the plate-like body 21 may also decrease to 50% of the maximum values M1 and/or M2.

The plate-like body 21 can include materials such as, for example, ceramic materials, which absorb more energy than the generally metal material of the nozzle body 12. In that manner, the measurement can be carried out with lower laser power levels in order to protect the nozzle body 12.

When the plate-like body 21 is used, it is further possible to check the focus position FL of the laser beam 3. Generally, the focal point F of the laser beam 3 is adjusted using the optical focusing unit 10 and the adaptive redirecting mirror 9.2 in such a manner that the beam 3 is located at the desired focus position FL in the work plane 5. However, the optical elements arranged in the beam path of the laser beam 3 become hot during operation of the laser processing machine 1, such that the focal point F may move out of the desired focus position FL. In order to check whether the focus position is still correct, the focal point F is displaced in the third spatial direction Z ("Z direction"), for example, by moving the adaptive redirecting mirror 9.2. In principle, a small focus diameter on the plate-like body 21 results in a large intensity of the acoustic signal produced, and vice versa. When the focal point F is varied, the focus diameter on the plate-like body 21 is varied. If the focal point F is in the plane of the plate-like body 21, the diameter of the laser spot on the body 21 is at a minimum and the intensity of the photoacoustic signal is at a maximum. If the maximum is detected at a location other than at the desired focus position FL in the Z direction, the focal point F should be displaced in the Z direction, which can be carried out, for example, by adjusting the adaptive mirror 9.2.

Figure 2B:
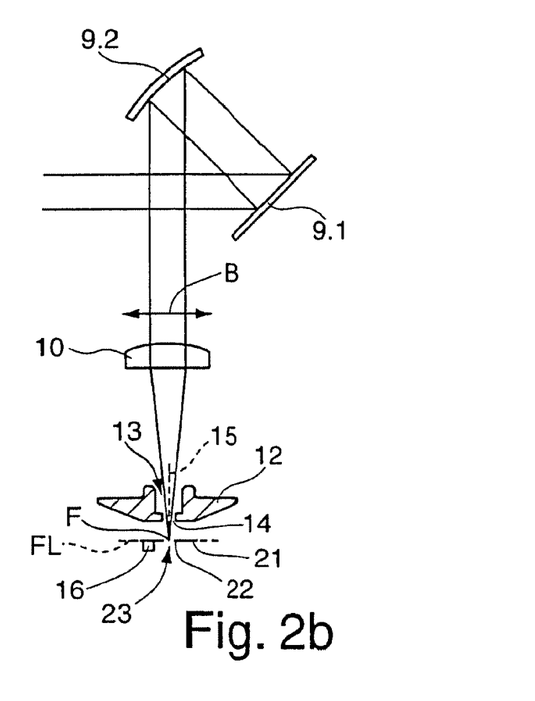

Alternatively, when the nozzle center and the focus position are determined, as shown in FIG. 2b, the plate-like body 21 may have a region of continuous material which is larger than the nozzle opening 13 and a uniform edge 22 which is formed in the plate-like body 21 at a square or circular opening 23. In that case, the focus position FL of the laser beam 3 can also be determined, as described above, by scanning the edge 22 of the opening 23 of the plate-like body 21 at different focus adjustments. This allows the determination not only of the position of the focal point but also of the shape of the laser beam in the region of the focal point (beam caustic).

In the manner set out above, the beam position of the laser beam 3 within the opening 14, 23 can be determined and the laser beam 3 can be centered therein, with both actions being able to be carried out in an automated manner. The focus position can further be checked and may be corrected. It will be understood that the above-described method is not limited to use in laser processing machines, but can also advantageously be used in other equipment, in which the position of a laser beam in any opening is intended to be determined and adjusted, in particular centered.

A number of embodiments have been described. Nevertheless, it will be understood that various modifications may be made without departing from the spirit and scope of the invention. Accordingly, other embodiments are within the scope of the following claims.

What is claimed is:

1. A method for determining a pulsed laser beam point of contact, the method comprising:
    a) moving the pulsed laser beam relative to an edge in at least one spatial direction until the pulsed laser beam touches the edge, wherein the at least one spatial direction is at a right angle relative to an axis of the pulsed laser beam and wherein the edge is formed at an opening;
    b) measuring acoustic oscillations produced photoacoustically during the movement of the pulsed laser beam; and
    c) determining the pulsed laser beam point of contact with the edge based on the measured acoustic oscillations.

2. The method according to claim 1 further comprising:
    adjusting a position of a focal point of the pulsed laser beam in a direction of the axis of the pulsed laser beam and repeating a) to c).

3. The method according to claim 1, wherein measuring acoustic oscillations comprises measuring an oscillation power as a function of a position of the pulsed laser beam and wherein determining the pulsed laser beam point of contact with the edge comprises associating a predetermined fraction of a maximum oscillation power with the pulsed laser beam point of contact.

4. The method according to claim 1, further comprising:
    determining two opposite laser beam points of contact on the edge of the opening; and
    determining a position of the pulsed laser beam in the opening based on the two opposite laser beam points of contact, wherein the pulsed laser beam completely touches the opening in a first spatial direction.

5. The method according to claim 4, further comprising determining a diameter of the pulsed laser beam based on a path of movement of the pulsed laser beam from a start point to the two opposite laser beam points of contact.

6. The method according to claim 4, further comprising determining a cross-section dimension of the opening based on a spacing between the two opposite laser beam points of contact in the first spatial direction and a spacing between two laser beam points of contact in a second different spatial direction.

7. The method according to claim 1, further comprising:
determining two opposite laser beam points of contact on the edge of the opening;
determining a desired position of the pulsed laser beam in the opening based on the two opposite laser beam points of contact; and
moving the pulsed laser beam towards the desired position, wherein the desired position is at a center between the two opposite laser beam points of contact, and wherein the pulsed laser beam completely touches the opening in the first spatial direction.

8. The method according to claim 1, wherein the opening is in a nozzle body of a laser processing nozzle.

9. The method according to claim 1, further comprising:
automatically moving an optical focusing unit, wherein moving the optical focusing unit is arranged in a direction of the pulsed laser beam propagation and the edge is a stationary edge; and/or
modifying a redirecting mirror arranged in the pulsed laser beam path.

10. The method according to claim 1, wherein measuring acoustic oscillations comprises measuring the acoustic oscillations using at least one acoustic sensor.

11. The method according to claim 1, further comprising comparing the measured acoustic oscillations with a characteristic value of the pulsed laser beam.

12. The method according to claim 1, further comprising moving the pulsed laser beam and measuring the acoustic oscillations under a protective gas.

13. The method according to claim 1, wherein the oscillations are produced by a plate body arranged in a path of the beam and downstream of a nozzle body.

14. The method according to claim 13, further comprising varying a spacing between a focal point of the pulsed laser beam and the plate body along the axis of the pulsed laser beam to determine a focus position.

15. The method according to claim 13, wherein the plate body is configured to absorb more laser power than a material of the nozzle body.

16. A laser processing machine comprising:
a laser configured to emit a pulsed laser beam;
a laser processing nozzle on a laser processing head, the laser processing nozzle comprising a first opening,
wherein the laser processing nozzle is arranged to allow the pulsed laser beam emitted by the laser to pass through the first opening,
the pulsed laser beam and the first opening are movable relative to each other in a first spatial direction, the first spatial direction being at a right-angle with respect to an axis of the pulsed laser beam;
an acoustic sensor configured to measure acoustic oscillations produced photoacoustically during movement of the pulsed laser beam; and
an evaluation device configured to determine a point of laser beam contact with an edge of a second opening based on acoustic oscillations measured by the acoustic sensor.

17. The laser processing machine according to claim 16, further comprising:
an optical focusing unit,
wherein the optical focusing unit is arranged in a path of the pulsed laser beam and upstream of the laser processing nozzle; and
an automatic movement device configured to automatically modify a position or orientation of the optical focusing unit.

18. The laser processing machine according to claim 17, further comprising:
a laser processing head; and
an adjustment station to which the laser processing head moves,
wherein the automatic movement device is fitted to the laser processing head or to the adjustment station to move the pulsed laser beam to a desired position in the second opening.

19. The laser processing machine according to claim 16, further comprising a plate body arranged in a path of the pulsed laser beam and downstream of the laser processing nozzle, wherein the plate-like body includes the second opening.

20. The laser processing machine according to claim 16, wherein the first opening and the second opening coincide.

21. The laser processing machine according to claim 16, further comprising a beam trap to protect the acoustic sensor from scattered light.

22. The laser processing machine according to claim 16, wherein the acoustic sensor is fitted to the laser processing nozzle or positioned outside a path of the pulsed laser beam so as to be displaced in a spatial direction relative to the axis of the pulsed laser beam and is orientated at an angle relative to the axis of the pulsed laser beam.

* * * * *